United States Patent
Bridges

(10) Patent No.: US 6,999,849 B2
(45) Date of Patent: Feb. 14, 2006

(54) FOLDING ROBOTIC SYSTEM

(76) Inventor: John Clinton Bridges, 3284 Medlock Bridge Rd., Norcross, GA (US) 30092

(*) Notice: Subject to any disclaimer, the term of this patent is extended or adjusted under 35 U.S.C. 154(b) by 0 days.

(21) Appl. No.: 10/351,451

(22) Filed: Jan. 24, 2003

(65) Prior Publication Data

US 2003/0155747 A1 Aug. 21, 2003

Related U.S. Application Data

(60) Provisional application No. 60/351,901, filed on Jan. 24, 2002.

(51) Int. Cl.
*G06F 19/00* (2006.01)
(52) U.S. Cl. .................................. 700/245; 901/50
(58) Field of Classification Search ............... 700/245, 700/248, 249, 254, 257, 262; 901/15, 21, 901/50; 701/23; 414/680; 451/57; 244/159
See application file for complete search history.

(56) References Cited

U.S. PATENT DOCUMENTS

| 4,152,010 A | | 5/1979 | Kassai |
| 4,493,492 A | | 1/1985 | Balabanova |
| 4,573,548 A | * | 3/1986 | Holland .................... 180/211 |
| 4,751,868 A | | 6/1988 | Paynter |
| 5,159,988 A | * | 11/1992 | Gomi et al. .................. 180/8.6 |
| 5,515,934 A | * | 5/1996 | Davis .......................... 180/8.2 |
| 5,699,886 A | | 12/1997 | Latshaw |
| 5,739,655 A | * | 4/1998 | Torii et al. ............. 318/568.12 |
| 5,870,527 A | * | 2/1999 | Fujikawa et al. ........... 700/245 |
| 5,929,585 A | * | 7/1999 | Fujita ...................... 318/568.2 |
| 6,322,098 B1 | | 11/2001 | Lan |
| 6,439,596 B1 | * | 8/2002 | Tsai ........................... 280/639 |
| 6,591,165 B1 | * | 7/2003 | Takamura ................... 700/245 |
| 6,675,068 B1 | * | 1/2004 | Kawasaki ................... 700/245 |

* cited by examiner

*Primary Examiner*—J. Allen Shriver
(74) *Attorney, Agent, or Firm*—Alston & Bird LLP

(57) ABSTRACT

A portable robotic system having a folding carriage is disclosed. The carriage in one embodiment includes two legs and a lateral stabilizer. The folding legs and stabilizer allow the carriage to be maneuvered into a plurality of open and closed positions. In the open positions, the legs and stabilizer are spaced apart to support the robotic system during operation. In the closed positions, the legs and stabilizer and substantially parallel to one another. In one closed position with one leg or stabilizer extended to within reach of a person, the carriage may be rolled like a dolly. In another closed position with one leg or stabilizer collapsed against the carriage, the carriage may be carried like a suitcase. Methods of folding and transporting a robotic system and carriage are also disclosed.

6 Claims, 11 Drawing Sheets

FOLDING ROBOTIC SYSTEM

CROSS-REFERENCE TO RELATED APPLICATIONS

This application claims the benefit and priority of the pending Provisional Patent Application entitled, "Folding Robotic System," Application Ser. No. 60/351,901, filed Jan. 24, 2002, which is incorporated herein by reference, together with all attachments and exhibits thereto.

FIELD OF THE INVENTION

The present invention relates generally to mobile robotic devices and systems. More particularly, the invention provides a robotic system supported by a versatile foundation having two or more legs that can be positioned in several ways to create a conveniently portable carriage for the entire system.

BACKGROUND OF THE INVENTION

Many robots are mobile, but few are truly portable. Most robotic systems cannot be easily moved from one location to another. Robots are being developed for a wide variety of uses, from technically-complex tasks such as exploring the deep oceans, surveying distant planets, or performing surgery, to more socially-complex tasks such as leading guided tours, interacting with humans, monitoring secure areas, delivering mail, and making sales presentations. As more uses are discovered for sophisticated robotic systems, mobility will become increasingly important.

Generally, a robot is an electromechanical device that senses information about its environment, processes the sensory data gathered, and in response follows a set of instructions and performs a task. Robots generally possess some degree of mobility. Modern robots may include a myriad of sensors and may be programmed to take action automatically based upon the information gathered by those sensors.

Advances in computer science have increased the processing speed and complexity with which robotic systems can gather and analyze data. As the analytical capacity of robots approach higher levels of reasoning and thought, more and more robotic systems will be able to operate autonomously. Autonomous operation includes making reasoned and situation-appropriate decisions and planning future action. Technological advances will improve the ability of robots to participate in socially complex tasks, such as interacting with humans.

Robot portability is desirable because new uses and applications are being developed that require frequent transportation of robotic systems. Most robots cannot travel great distances because they are too slow, too limited by terrain, or their drive systems are too inefficient. Accordingly, most robotic systems must be transported by other means. For long distances, the limitations imposed by commercial transportation represent a significant barrier for most robotic systems. For shorter distances, the average person usually cannot move an entire robotic system because most systems are too large or too heavy to be easily moved or carried.

Thus, there is a need in the art for an improved apparatus and method of transporting a robotic system to a distant site without additional equipment and without sacrificing the expected advantages and benefits offered by using robotics at various locations.

SUMMARY OF THE INVENTION

The above and other needs are met by the present invention, which provides a robotic system supported by a versatile carriage having two or more legs and a lateral stabilizer, each of which can be positioned in several ways to create a conveniently portable system. The system disclosed includes a portable robotic apparatus, a folding carriage, and a method for folding and transporting a robotic apparatus.

In one aspect of the present invention, a folding carriage for transporting a payload over a surface may include a stage supporting the payload, at least one first leg and at least one second leg (each of the first and second legs having a proximal end adjacent to and supporting the stage and an opposing distal end). The first leg may include a first contact element connected to the distal end by a first mounting assembly. The second leg may include a second contact element connected to the distal end by a second mounting assembly. The carriage may further include at least one lateral stabilizer configured to balance the carriage with respect to the surface.

In a related aspect, the legs and the stabilizer are foldable with respect to the stage from at least one open position in which the carriage is substantially balanced with respect to the surface, to at least one closed position in which the legs and the stabilizer are substantially parallel to one another and define a closed carriage plane.

In one embodiment, the first leg is pivotably connected to the stage. The carriage may also include a means for moving the first leg between at least one collapsed position and one or more other positions, wherein the collapsed position is substantially parallel to the closed carriage plane. The carriage may also include a means for locking the first leg in at least one of the collapsed and the other positions.

In one embodiment, the second leg is pivotably connected to the stage. The carriage may also include a means for moving the second leg between at least one collapsed position and one or more other positions, wherein the collapsed position is substantially parallel to the closed carriage plane. The carriage may also include a means for locking the second leg in at least one of the collapsed and the other positions.

In one embodiment of the carriage, the first contact element includes one or more selected from the group consisting of wheels, rollers, skids, casters, ball casters, caterpillar tracks, skis, skids, and knobs. Likewise, the second contact element includes one or more selected from the group consisting of wheels, rollers, skids, casters, ball casters, caterpillar tracks, skis, skids, and knobs.

In another embodiment of the carriage, one of the closed positions is further characterized by a distal end of one of the legs stabilizer being positioned within a reach envelope of a person. A reach envelope approximates the space above the surface in which an object may be grasped. The distal end may include a pull for grasping.

In one embodiment, the first contact element may include a first drive assembly and the carriage may include a means for disengaging the first drive assembly. Likewise, the second contact element may include a second drive assembly and the carriage may further include a means for disengaging the second drive assembly.

In a related aspect, the carriage may also include a means for retracting the first contact element and a means for retracting the second contact element.

In another aspect, the carriage may include a handle located within a lift distance from a reach envelope of a person when the carriage is in one of the closed positions. A lift distance is generally less than a radius of a reach envelope.

In one embodiment of the carriage, the lateral stabilizer may have a proximal end and an opposing distal end, and may include a lateral contact element disposed upon the distal end and a pivotable connection between the proximal end and the stage. The lateral stabilizer may include a means for moving it between at least one collapsed position and one or more other positions, wherein the collapsed position is substantially parallel to the closed carriage plane. The lateral stabilizer may also include a means for locking it in at least one of the collapsed or the other positions.

In one embodiment, the lateral contact element includes one or more selected from the group consisting of wheels, rollers, skids, casters, ball casters, caterpillar tracks, skis, skids, and knobs.

In one embodiment, one of the closed positions is further characterized by a distal end of the lateral stabilizer being positioned within a reach envelope of a person. A pull connected to the lateral stabilizer may be located within the reach envelope.

In another aspect, the lateral contact element may include a lateral drive assembly and the carriage may include a means for disengaging the lateral drive assembly. The carriage may also include a means for retracting the lateral contact element.

In one embodiment of the carriage, the lateral stabilizer may include a motorized drive system modulated by a control system for adjusting a plurality of motor torques to maintain balance.

In another aspect of the invention, the payload may be pivotably attached to the stage. The carriage may include a console sized to house one or more controllers. In a related aspect, the carriage may also include a docking station configurable to receive any of a plurality of payloads. The docking station may include a plurality of attachment locations disposed upon the carriage, a pivot assembly connected to the carriage at one or more of the attachment locations, and one or more portals through the carriage, positioned to facilitate the passage of connectors between the carriage and the payload.

In one embodiment, the payload includes a robot. In another embodiment, the payload includes a folding robotic system, which includes a trunk having one or more segments pivotably connected, wherein the trunk is foldable with respect to the stage from at least one open trunk position in which the robotic system is substantially balanced with respect to the surface, to at least one closed trunk position in which the segments are substantially parallel to one another and substantially parallel to the closed carriage plane.

In another aspect of the present invention, a robotic apparatus capable of moving over a surface is provided. The robotic apparatus may include: (1) a trunk having one or more segments pivotably connected; (2) at least one first leg having a first proximal end adjacent to and supporting said trunk and an opposing first distal end, said at least one first leg comprising a first contact element connected to said first distal end by a first mounting assembly; (3) at least one second leg having a second proximal end adjacent to and supporting said trunk and an opposing second distal end, said at least one second leg comprising a second contact element connected to said second distal end by a second mounting assembly; (4) at least one lateral stabilizer having a fixed end and an opposing free end, said at least one lateral stabilizer comprising a lateral contact element connected to said free end by a lateral mounting assembly; and, (5) at least one motorized assembly connected to drive one of said contact elements of a member selected from the group consisting of said at least one first leg, said at least one second leg, and said at least one lateral stabilizer. The legs and the stabilizer may be foldable with respect to the trunk from at least one open position in which the robotic system is substantially balanced with respect to the surface, to at least one closed position in which the legs and the stabilizer are substantially parallel to one another and define a closed carriage plane.

In one embodiment, the robotic apparatus may also include a console having a top wall and one or more side walls, the console sized and shaped to house a computing device and a plurality of controllers. The console may also include one or more portals through the walls to permit passage of one or more connectors.

In one embodiment of the robotic apparatus, the trunk is foldable with respect to the legs, from at least one open trunk position in which the robotic system is substantially balanced with respect to the surface, to at least one closed trunk position in which the segments are substantially parallel to one another and substantially parallel to the closed carriage plane.

In one embodiment of the robotic apparatus, the first leg is pivotably connected to the trunk. The robotic apparatus may include a means for moving the first leg between at least one collapsed position and one or more other positions, wherein the at least one collapsed position is substantially parallel to the closed carriage plane. The robotic apparatus may also include a means for locking the first leg in at least one of the collapsed and the other positions.

In one embodiment of the robotic apparatus, the second leg is pivotably connected to the trunk. The robotic apparatus may include a means for moving the second leg between at least one collapsed position and one or more other positions, wherein the at least one collapsed position is substantially parallel to the closed carriage plane. The robotic apparatus may also include a means for locking the second leg in at least one of the collapsed and the other positions.

In one embodiment of the robotic apparatus, the first contact element includes one or more selected from the group consisting of wheels, rollers, skids, casters, ball casters, caterpillar tracks, skis, skids, and knobs. Likewise, the second contact element includes one or more selected from the group consisting of wheels, rollers, skids, casters, ball casters, caterpillar tracks, skis, skids, and knobs.

In another embodiment of the robotic apparatus, one of the closed positions is further characterized by a distal end of one of the legs stabilizer being positioned within a reach envelope of a person. A reach envelope approximates the space above the surface in which an object may be grasped. The distal end may include a pull for grasping.

In one embodiment, the first contact element may include a first drive assembly and the robotic apparatus may include a means for disengaging the first drive assembly. Likewise, the second contact element may include a second drive assembly and the robotic apparatus may further include a means for disengaging the second drive assembly.

In a related aspect, the robotic apparatus may also include a means for retracting the first contact element and a means for retracting the second contact element.

In another aspect, the robotic apparatus may include a handle located within a lift distance from a reach envelope of a person when the robotic apparatus is in one of the closed positions. A lift distance is generally less than a radius of a reach envelope.

In one embodiment of the robotic apparatus, the lateral stabilizer may include a lateral contact element disposed upon the free end and a pivotable connection between the proximal end and the trunk. The lateral stabilizer may include a means for moving it between at least one collapsed position and one or more other positions, wherein the collapsed position is substantially parallel to the closed carriage plane. The lateral stabilizer may also include a means for locking it in at least one of the collapsed or the other positions.

In one embodiment, the lateral contact element includes one or more selected from the group consisting of wheels, rollers, skids, casters, ball casters, caterpillar tracks, skis, skids, and knobs.

In one embodiment, one of the closed positions is further characterized by a distal end of the lateral stabilizer being positioned within a reach envelope of a person. A pull connected to the lateral stabilizer may be located within the reach envelope.

In another aspect, the lateral contact element may include a lateral drive assembly and the robotic apparatus may include a means for disengaging the lateral drive assembly. The robotic apparatus may also include a means for retracting the lateral contact element.

In one embodiment of the robotic apparatus, the lateral stabilizer may include a motorized drive system modulated by a control system for adjusting a plurality of motor torques to maintain balance.

In another aspect, the payload may be pivotably attached to the trunk. The robotic apparatus may include a console sized to house one or more controllers.

In another aspect of the present invention, a mobile robotic apparatus is provided, which may include a trunk, a contact element supporting the trunk and powered by a drive assembly for transporting the system over a surface, and a lateral stabilizer configured to balance the system with respect to the surface. The contact element may be foldable with respect to the trunk, from a plurality of open positions in which the system is substantially balanced, to a plurality of closed positions in which the trunk and the element are substantially parallel.

In one embodiment of the mobile robotic apparatus, the contact element may include a lower element having a joint end and an opposing distal end, and an upper element connected to the lower element at a joint, the upper element having a joint end and an opposing graspable end. The upper element may be foldable with respect to the lower element to form a first closed position, in which: (1) the distal end of the lower element is in contact with the surface; (2) the upper element is substantially parallel to the lower element; and, (3) the graspable end lies with a reach envelope of a person.

In another embodiment, the joint further includes a handle and the upper element may be foldable with respect to the lower element to form a second closed position, in which: (1) the distal end of the lower element is in contact with the surface; (2) the upper element is substantially parallel to the lower element; (3) the graspable end lies near the distal end; and, (4) the handle lies within a lift distance from a reach envelope of a person; the lift distance being less than a radius of the reach envelope.

In yet another embodiment, the contact element may also includes an auxiliary element connected to the joint and having a joint end and an opposing handle end. The auxiliary element may be foldable with respect to the upper element and with respect to the lower element, to form a third closed position, in which: (1) the auxiliary element is substantially parallel to the upper element and to the lower element, and (2) the handle end lies with the reach envelope of a person.

In another aspect, the present invention provides a method of folding a robotic apparatus to prepare it for inactive transport over a surface. The apparatus may include a trunk having a base and one or more segments pivotably connected, at least two foldable legs each having a proximal end supporting the trunk near the base and a distal end connected to a surface contact element, and at least one lateral stabilizer connected to the trunk or to one of the legs. The method may include the steps of: (1) providing a handle near the base; (2) folding the segments into a collapsed position in which the segments are substantially parallel to one another; (3) folding the legs into a closed position in which the legs are substantially parallel to the segments; and (4) folding the stabilizer into a lowered position generally adjacent the legs in which the stabilizer is substantially parallel to the segments and to the legs to form a second closed position in which the handle lies within a lift distance from a reach envelope of a person, the reach envelope approximating a space above the surface in which an object may be grasped, and the lift distance being less than a radius of the reach envelope.

In one embodiment, the method may include the further steps of: (5) unfolding an elongate member selected from the group consisting of the legs and the stabilizer, and (6) raising the elongate member into a raised position generally opposite the segments in which the member is substantially parallel to the segments such that a free end of the elongate member lies with the reach envelope of a person.

In another aspect, the present invention provides a method of transporting a robotic apparatus over a surface. The apparatus may include a trunk having a base and one or more segments pivotably connected, at least two foldable legs each having a proximal end supporting the trunk near the base and a distal end connected to a surface contact element, at least one lateral stabilizer connected to the trunk or to one of the legs, and one or more drives assemblies powering the segments, the legs, and the stabilizer. The method may include the steps of: (1) providing a handle near the base; (2) disengaging the drive assemblies; (3) folding the segments into a collapsed position in which the segments are substantially parallel to one another; (4) folding the legs into a closed position in which the legs are substantially parallel to the segments; and, (5) folding the stabilizer into a lowered position generally adjacent the legs in which the stabilizer is substantially parallel to the segments and to the legs to form a second closed position in which the handle lies within a lift distance from a reach envelope of a person.

In one embodiment, the method may include the additional steps of: (6) grasping the handle; (7) lifting the robotic apparatus; and, (8) carrying the robotic apparatus over the surface.

In an alternative embodiment, the method may include the additional steps of: (6) unfolding an elongate member selected from the group consisting of the legs and the stabilizer; (7) raising the elongate member into a raised position generally opposite the segments in which the member is substantially parallel to the segments such that a free end of the elongate member lies with the reach envelope of a person; (8) grasping the free end of the elongate member; and, (9) rolling the robotic apparatus over the surface.

These and other objects are accomplished by the apparatus and method disclosed and will become apparent from the following detailed description of a preferred embodiment in conjunction with the accompanying drawings in which like numerals designate like elements.

BRIEF DESCRIPTION OF THE DRAWING

The invention will be more readily understood by reference to the following description, taken with the accompanying drawing figures, in which.

DETAILED DESCRIPTION OF THE INVENTION

The subject matter of this application is related to that of the U.S. Provisional Patent Application entitled, "Folding Robotic System," Application Ser. No. 60/351,901, filed Jan. 24, 2002, which is incorporated herein by reference in its entirety. Reference is now made to the figures, in which like numerals indicate like elements throughout the several views.

The system 10 of the present invention may be used in the context of robotic systems. The system 10, however, may also be used in other contexts where there is a need for a compact, portable carriage for an apparatus that may be too difficult to move otherwise. The system 10 in different sizes may be used as a carriage for transporting an object or payload of varying size, from tiny articles to very large items. The present invention, for example, may be applied to create system 10 for carrying a very small device through a narrow duct or artery. Or the present invention may be applied to create a large system 10 suitable for use in conjunction with a wheeled vehicle, for example, such as a cart, a tractor, or an automobile.

Figure 1:
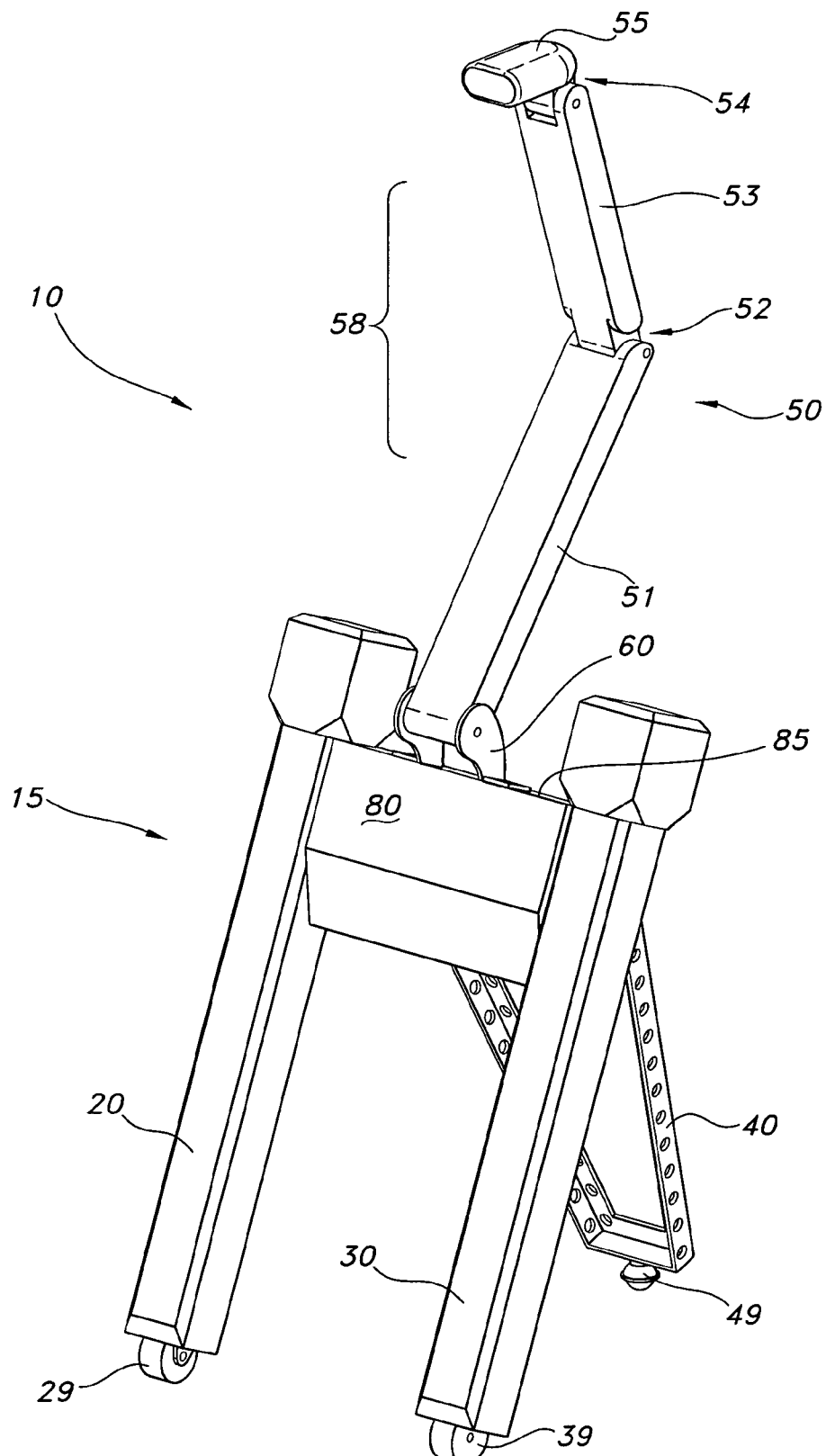
FIG. 1 is a pictorial view of a system according to one embodiment of the present invention.

FIG. 1 shows a system 10 according to one embodiment of the present invention. The system 10 depicted is a robotic system that includes a payload or body 50 (shaded for clarity) connected by a waist pivot assembly 60 to a supporting carriage 15. The carriage 15 supports the body 50 above the ground or other surface, such as a floor or natural terrain. Any surface above which the payload or body 50 may be supported may be referred to generally herein as the ground. The carriage 15 may include a first leg 20, a lateral stabilizer 30, and a second leg 40.

The carriage 15 may include a small platform or stage 85, such as the one defined by the top of the console 80 that spans the distance between the first leg 20 and the lateral stabilizer 30. The stage 85 may be a platform of any shape or size, a hinge, or nothing more than the converging ends of one or more of the legs 20, 40 and stabilizer 30. The stage 85 may also be referred to as the base of the trunk or body 50 attached to the carriage 15. In whatever shape the stage 85 may appear, one or more points on the stage 85 may be used to generally define a horizontal plane for reference. The horizontal reference plane, by definition, is generally perpendicular to a vertical axis defined by the force of gravity.

When referring to stability with respect to the surface upon which the carriage 15 sits or moves, it should be understood that the points of contact between the carriage 15 and the surface define a theoretical plane. The system 10 of the present invention, in one embodiment, uses a lateral stabilizer 30 to balance the system 10 with respect to that theoretical surface plane.

As shown in FIG. 1, the first leg 20 and the lateral stabilizer 30 resemble front legs, while the second leg 40 resembles a rear leg because of its position. This configuration is only one of many possible configurations for the supporting legs 20, 40, and the lateral stabilizer 30, such as those depicted in FIGS. 10, 11, and 12. The second leg 40, for the embodiment shown in FIG. 1, includes a pair of elongate members extending rearward from near the top of the carriage 15. In one embodiment, the two members are attached to the rear of the console 80 by a locking pivot assembly 45 (shown in FIGS. 2 and 7).

The legs 20, 40 and the lateral stabilizer 30 may be pivotably connected to each other or to the stage 85. The term pivotably as used herein refers to a linkage such as a ball-and-socket hinge or other type of connection capable of allowing rotation through a full range of motion, in any direction, including twisting about the part's own axis.

Lateral Stabilizer

Figure 10:
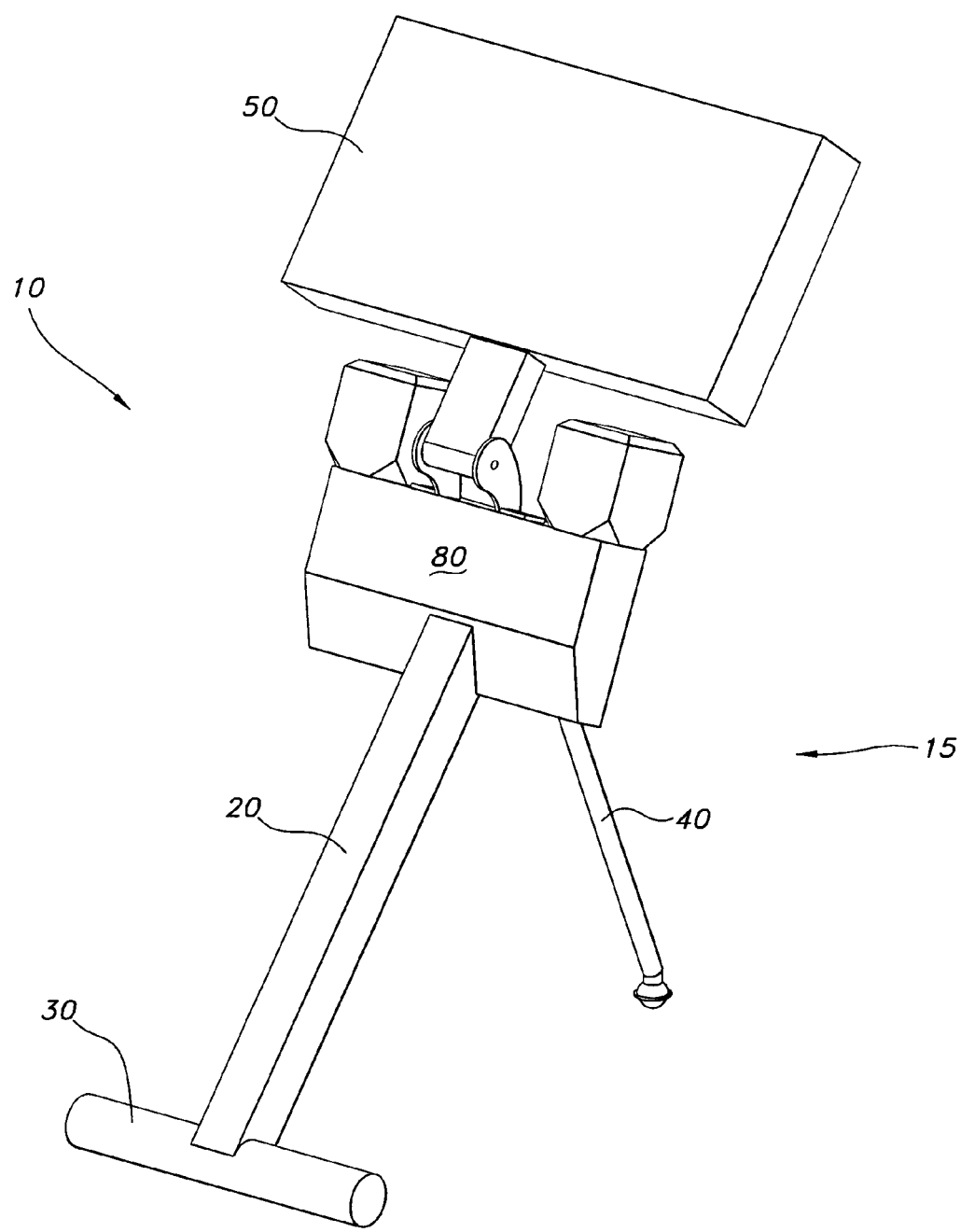
FIG. 10 is a perspective drawing of a system, according to one alternative embodiment of the present invention.

As shown in FIG. 10, the lateral stabilizer 30 may appear in the form of a wide roller or wheel. Similarly, a lateral stabilizer 30 may be a wide front or rear leg, a single outrigger extending laterally from the carriage 50, or a large ground-contacting element such as that provided by the wide roller in FIG. 10. The lateral stabilizer 30 may be sized and shaped to provide balance for the system 10 as a whole, as well as for the carriage 15 and the body 50, separately.

Figure 12:
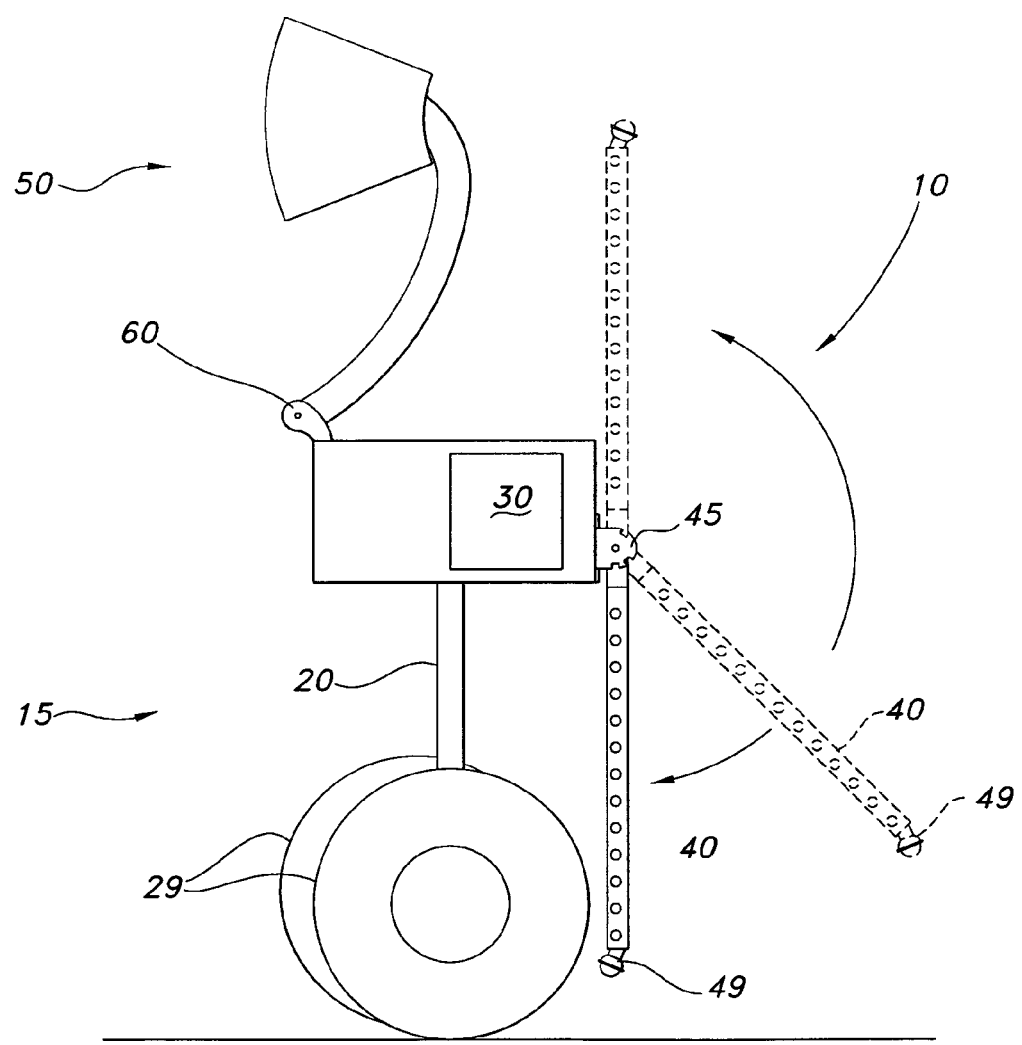
FIG. 12 is a side view of a system, including a carriage leg in several positions, according to one alternative embodiment of the present invention.

In one alternative embodiment, the lateral stabilizer 30 may include one or more gyroscopes or servomotors configured to maintain balance for the system 10, as shown in FIG. 12. The lateral stabilizer 30 may include a motorized drive system modulated by a control system for adjusting a plurality of motor torques to maintain balance, such as the system described in U.S. Pat. No. 6,367,817 B1, issued to Kamen, et al, which is incorporated herein by reference in its entirety.

Contact Elements

The carriage 15 further includes one or more ground-contacting elements attached to one or more of the legs supporting the stage 85. The first and second legs 20, 40 may each have a proximal end nearest the stage 85 and a distal end near the ground. The distal end may also be referred to as the free end. The ground-contacting elements, when present, may be typically positioned on the distal end, or course, where they may engage the ground surface. Each of the contact elements 29, 39, 49 may include one or more wheels, rollers, skids, casters, ball casters, caterpillar tracks, skis, skids, or fixed knobs.

As shown in FIG. 1, the carriage 15 includes a first contact element 29, a lateral contact element 39, and a second contact element 49, each of which may be positioned near the distal end of the first leg 20, lateral stabilizer 30, and second leg 40, respectively. One or more of the contact elements 29, 39, 49 may be connected to the first leg 20, lateral stabilizer 30, and second leg 40, respectively, by a mounting assembly, which may be capable of retracting the contact element. The contact elements 29, 39, 49 may be driven by a motor or other power source or, alternatively, free to roll or slide or otherwise engage the ground.

In one alternative embodiment, the contact elements 29, 39, 49 are configured to be folded against or otherwise retracted into the first leg 20, lateral stabilizer 30, and second leg 40, respectively. A means for retracting a contact element 29, 39, 49 may be provided for any reason, such as to further align all the segments of the carriage 15 in the closed carriage plane (described below) or to protect the element 29, 39, 49 from damage during transport. The means for retracting a contact element 29, 39, 49 may include a motorized retractor assembly, a manual linkage or spring-biased post, or any other of a variety of techniques that accomplish the function of causing the contact element to generally retract from its extended position or rotate toward a direction more parallel to the closed carriage plane. For example, the extended caterpillar treads shown in FIG. 11 may include a means for retracting that rotates and folds the treads against the leg 20 and stabilizer 30. The particular apparatus used for retracting a contact element may also be used to extend or un-retract the contact element when desired. Accordingly, the term "means for retracting" also includes a means for extending.

Controls

Figure 11:
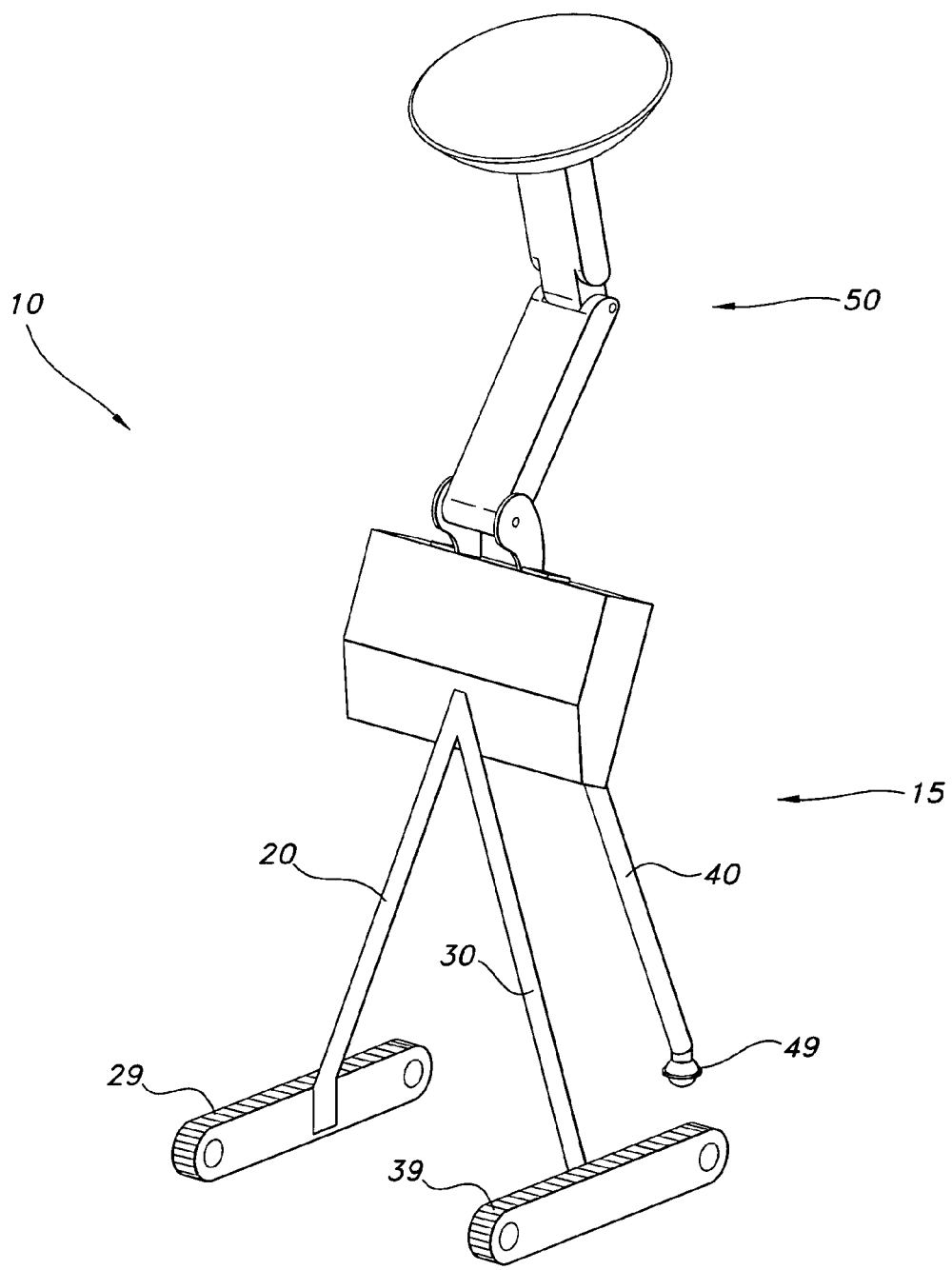
FIG. 11 is a perspective drawing of a system, according to one alternative embodiment of the present invention.

One or more of the contact elements 29, 39, 49 may include a motorized drive assembly having control circuitry that can be programmed to move the system 10 across a surface, either autonomously or by remote control. In one embodiment, a wheel assembly mounted in a bracket acts as the first contact element 29 and the lateral contact element 39. The wheels may be driven by independent motors, controlled in such a way as to enable the carriage 15 to be steered in a desired direction. The second contact element 49 may be a wheel, roller, skid, a fixed knob, or any other structure suited to the particular application. The second contact element 49 in the embodiment shown in FIG. 1 is a ball caster. The second contact element 49 in the embodiment shown in FIG. 11 is a smooth knob.

Like the contact elements 29, 39, 49, the motion of the legs 20, 40 and the lateral stabilizer 30 may be powered by a motorized drive assembly having control circuitry that can be programmed to control movement of the system 10. The means for moving the legs 20, 40 and the lateral stabilizer 30 may include servomotors or other motors, manipulation by hand, a combination of manual and motor-driven force, a gravitational force produced by aligning other elements of the system 10 such as the stage 85, or any other method of exerting a force on the legs 20, 40 or the lateral stabilizer 30.

The contact elements 29, 39, 49 may include any of a variety of structures, including casters, rollers, ball casters, caterpillar tracks, skis, flat skids, or fixed knobs. The contact elements 29, 39, 49 may be driven or they may roll freely. In one embodiment, the contact elements 29, 39, 49 are configured to be folded against or otherwise retracted into the first leg 20, lateral stabilizer 30, and second leg 40, respectively.

Any of a variety of steering methods may be used. An onboard computer and control circuitry may be provided to control the speed of the independently-driven wheels or contact elements, so that differences in speed would cause a change in the direction of the system 10. Alternatively, an onboard computer may be configured to rotate the wheels or other contact elements in order to move the system 10 in a particular direction. In another alternative, the second contact element 49 may be motor-driven and actively rotated in order to steer the system 10.

A feedback system may be included to detect when a stall condition develops in one or more of the motors. In the alternative, one or more sensors independent of the motors and drive assembly may be provided. The sensors may be configured to disengage the motors and/or brake the driven contact elements if the system 10 becomes unstable or out of balance. The sensors may also be configured to detect the presence of obstacles.

A central console 80, shown in FIG. 1, may be used to house an onboard computer, associated control circuitry, and a power supply such as a standard or rechargeable battery. Re-charging may be accomplished by providing a charging jack for connection to a power outlet or, in one embodiment, by programming the system 10 to automatically return to a predetermined charging area and begin re-charging whenever the available stored power reaches a certain level.

In one embodiment, an onboard computer is provided and may be housed in a console 80, as shown in FIG. 1. The computer may be programmed to drive the motors at particular speeds in order to produce a desired maneuver. The computer may be programmed to react in a pre-determined manner in response to certain expected conditions, such as encountering an obstacle. The computer may, for example, temporarily reverse the drive motors to back away from an obstacle, turn the system 10 in a new direction, and proceed. If a prolonged stall occurs, the computer may be programmed to disengage and/or stop the drive motors and sound an alarm.

An onboard computer, in one embodiment, may include an algorithm to allow the system 10 to travel randomly through a space, such as an interior room. The computer may also include an obstacle mapping algorithm so that the system 10 can sense obstacles within a space, store data about their size and location, and in response plan and remember an optimized route through the space.

In another embodiment, an onboard computer may be configured to communicate with and respond to external commands, including but not limited to human voice commands, input signals received from wireless remote controls, signals received from other nearby robots, signals sent via the Internet, or algorithms executed in an external computer and transmitted to the onboard computer by a wireless method.

Payload

The payload or body 50 of the system 10 of the present invention, in the embodiment, includes a lightweight robot torso that is configured to fold into or otherwise retract against one or more of the supporting legs of the carriage 15. As shown in FIG. 1, one such robot body 50 includes a head 55 connected by a neck hinge 54 to a supporting trunk 58. The trunk 58 may be articulated, having a first segment 51 and a second segment 53 pivotably connected by a hinge 52. The head 55 may be considered to be a specialized type of segment. The motion of the body 50 may be accomplished manually or by an automatic method, such as using servomotors controlled by an onboard computer. For example, the articulated trunk 58 of a robot body 50 may be equipped with motors to allow movement of the head 55 and segments 51, 53 with respect to one another.

Figure 2:
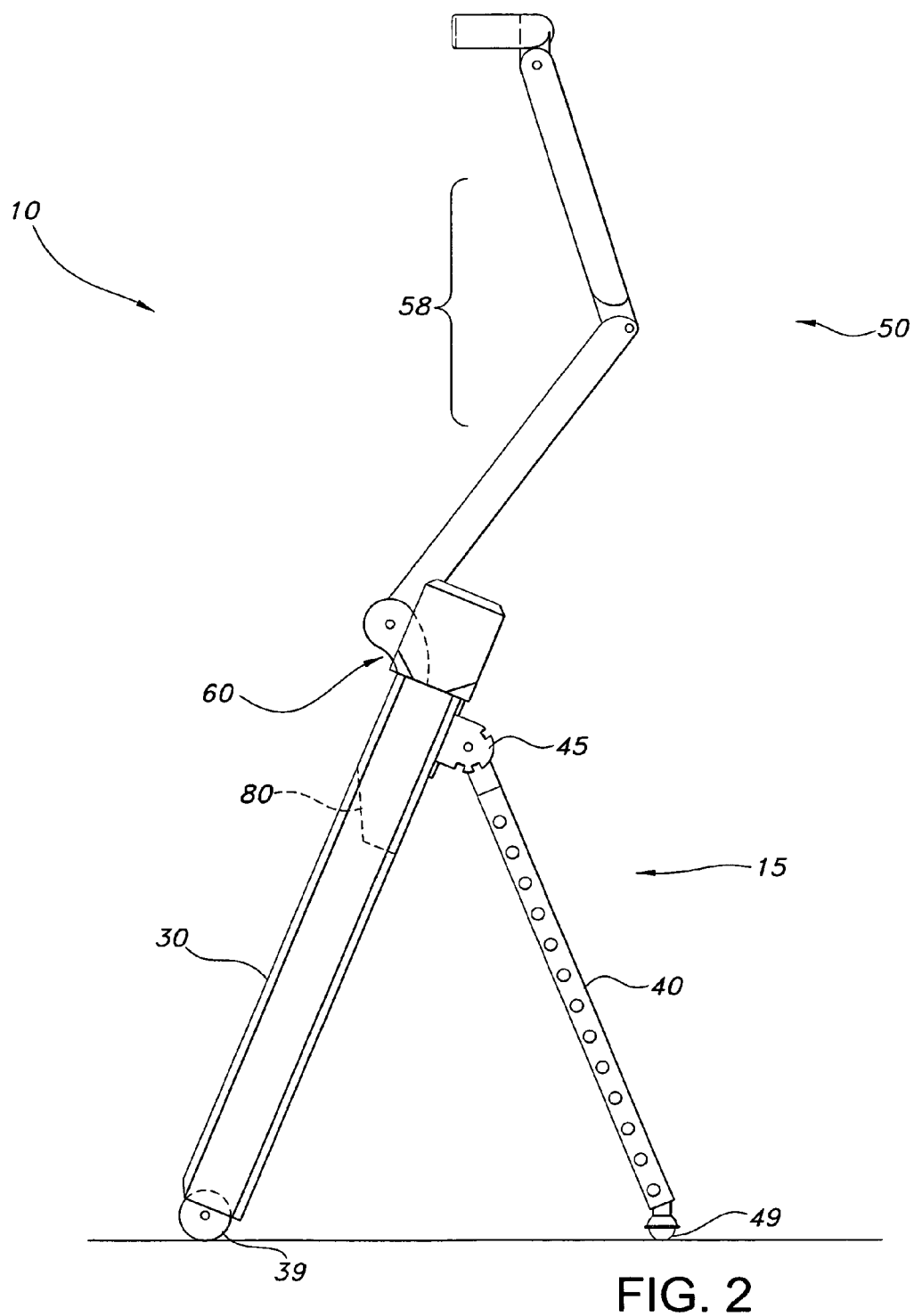
FIG. 2 is a side view of a body supported by a carriage, according to one embodiment of the present invention.
Figure 3:
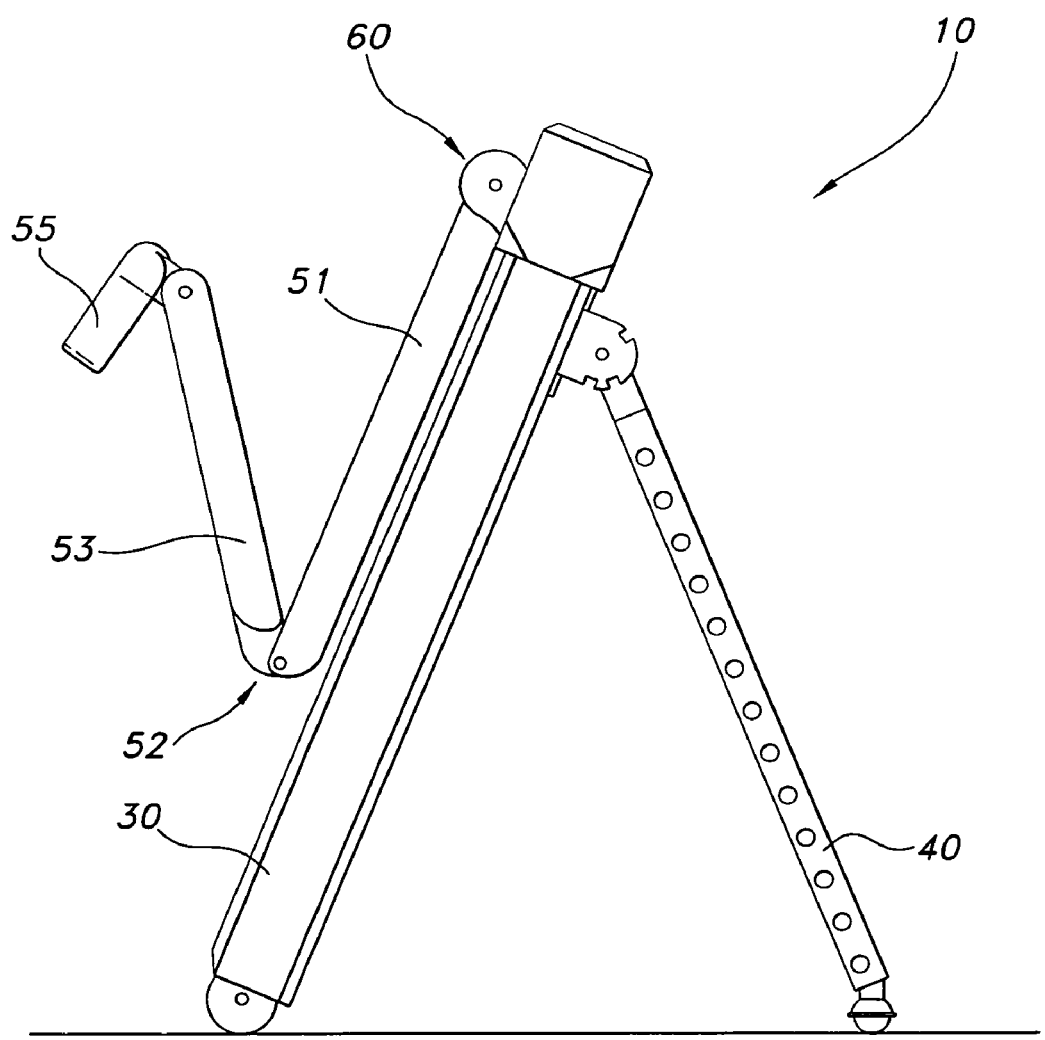
FIG. 3 is a side view of a folding body in an intermediate position and a carriage, according to one embodiment of the present invention.
Figure 4:
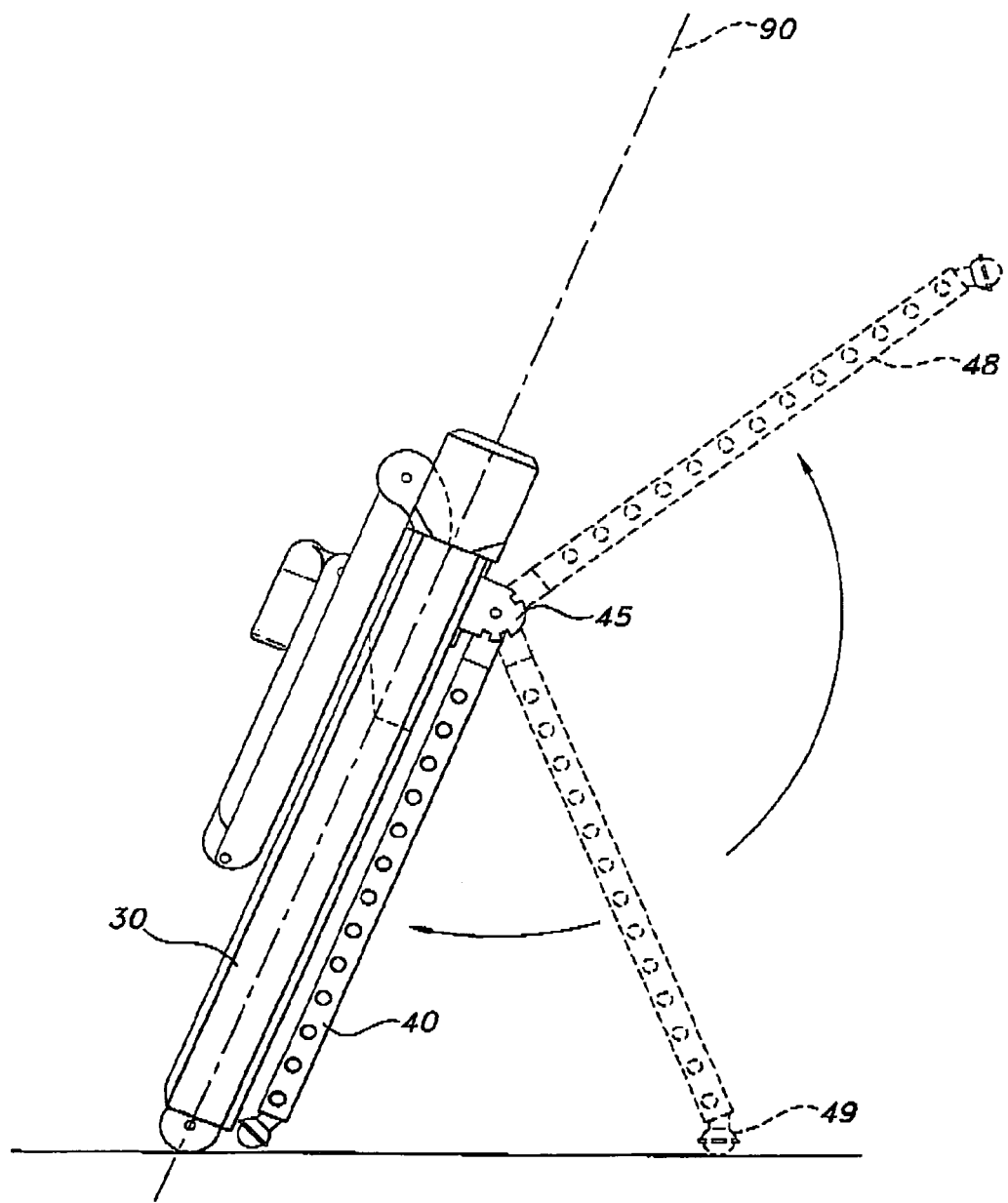
FIG. 4 is a side view of a carriage leg in several positions, according to one embodiment of the present invention.

Comparing the generally upright position of the body 50 in FIG. 2 to the intermediate position of the body 50 shown in FIG. 3, it will be appreciated that the waist pivot assembly 60, the hinge 52, and the neck hinge 43 allow the body segments 51, 53 and head 55 to rotate with respect to one another. In one aspect of the invention, the entire body 50 may be collapsed and stored against the first leg 20 and stabilizer 30. As the body 50 collapses, as shown in FIG. 3, the head 55 rotates counter-clockwise with respect to the second segment 53; the second segment 53 rotates clockwise with respect to the first segment 51; and the first segment 51 rotates counter-clockwise about the waist pivot assembly 60. Other rotations, relative folding directions, and segment configurations are contemplated for whatever kind of payload or body 50 may be attached to the carriage 15. The collapse and storage of the body 50 may be accomplished manually or automatically, such as by using controlled servomotors. The body 50 in its fully folded position is shown in FIG. 4.

Docking Station

Figure 9:
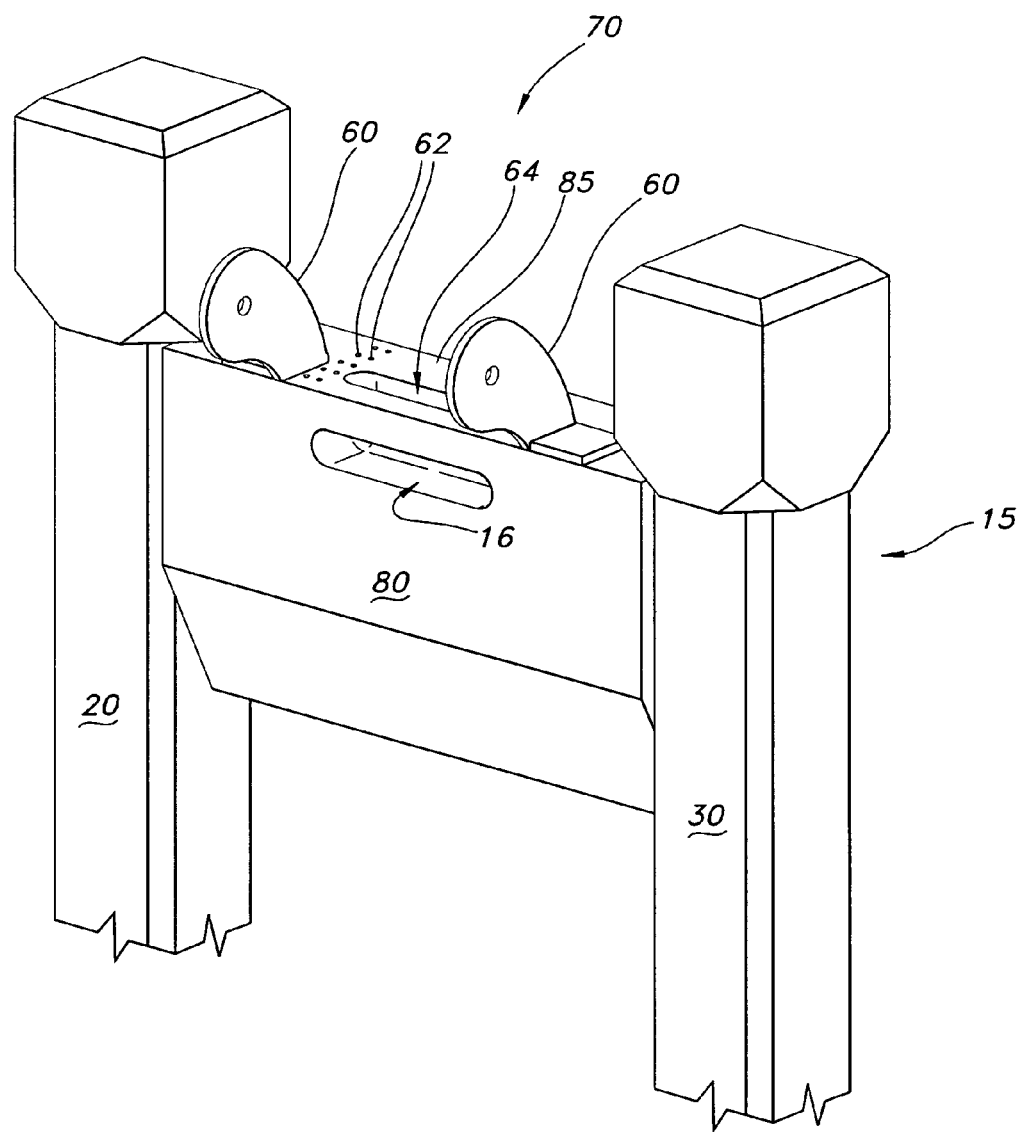
FIG. 9 is a perspective drawing of a docking station, according to one embodiment of the present invention.

Referring briefly to FIG. 9, a perspective view is shown of a carriage 15 according to one embodiment of the present invention. The waist pivot assembly 60 may be configured to provide a pair of pivot points for receiving any of a variety of payloads or bodies 50 (shown in FIG. 1). An onboard computer or other control equipment may be housed in a console 80. The carriage 15 may include a docking station 70 for receiving and connecting a body 50. The docking station 70 may include an array of mounting locations 62, a waist pivot assembly 60, and one or more access portals 64. The pivot assembly 60 may be re-located to any place in the array 62 to best fit the size and shape of the body 50 to be attached. The adjustable array 62 may also be used to attach the body 50 to the carriage 15 in a non-central or non-forward-facing position, if desired. A particular payload or body 50, for example, may be asymmetrical or otherwise shaped such that the body 50 would place eccentric loads on the carriage 15 if installed centrally. The array 62 provides flexibility to the system 10 while providing a universal docking station 70 for any kind of payload or body 50.

In one embodiment, the array 62 of locations may be provided by a slidably adjustable pivot assembly 60 with an apparatus for locking the assembly 60 in any desired location or orientation. For example, the pivot assembly 60 may be mounted on rails or the array 62 may consist of elongate slots, to provide an infinite number of precise spacings to receive a body 50 of any size and shape.

As shown in FIG. 9, the portal 64 is defined by an opening in the console 80, where an onboard computer may be housed. The portal 64 may be positioned between the pivot points of the waist pivot assembly 60, as shown, or at any of a variety of locations where cables, connectors, or other equipment must pass through an area of the carriage 15. The term connectors, as used herein, shall refer to all the types of equipment that may provide a connection between components of the system 10. In one embodiment, one or more portals 64 may be provided through a wall of the console 80 so that cables and connectors may be passed between an onboard computer or controller inside the console 80 to assemblies outside such as the servomotors controlling movement of the body segments 51, 53, 55 or the legs 20, 40 of the carriage 15. Although the portal 64 in FIG. 9 is depicted as a simple opening, the portals 64 may include more sophisticated ports such as parallel, serial, USB, or other types, to suit the particular needs of the body 50 being attached to the carriage 15.

Figure 8:
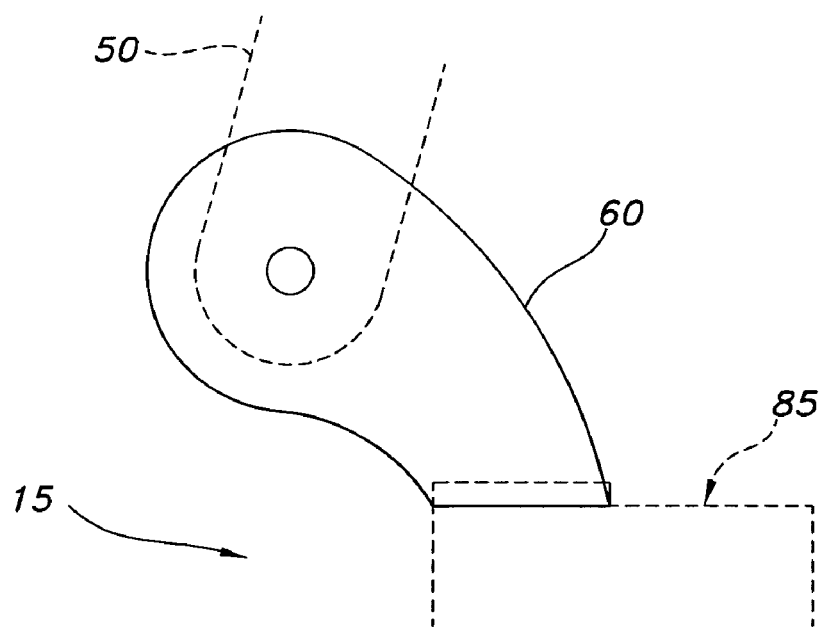
FIG. 8 is a side view of a waist pivot assembly, according to one embodiment of the present invention.

FIG. 8 is a closer side view of a waist pivot assembly 60 mounted upon a stage 85, according to one embodiment of the present invention. The waist pivot assembly 60 may be used to pivotably connect a payload or body 50 to the carriage 15. The shape of the waist pivot assembly 60, as shown in FIG. 8, extends beyond the front edge (the left edge in the figure) of the carriage 15, such that the body 50 when folded downward may rest against the front side of the carriage 15. The affect of the shape of pivot assembly 60 can be appreciated in FIG. 3, which shows the first segment 51 resting against the front side of the carriage 15.

Folding Legs

Referring again to FIG. 4, the legs 20, 40 and the lateral stabilizer 30, in one aspect of the present invention, may be collapsed against or otherwise folded into each other such that all the supporting elements 20, 30, 40 of the carriage 15 lie along or near the same general plane, referred to herein as the "closed carriage plane." The closed carriage plane serves as a reference plane which is roughly centered among the various substantially-parallel elements 20, 30, 40. As such, the space occupied by the folded carriage and its component parts will have a thickness, and the closed carriage plane represents a theoretical plane at the center of the substantially-parallel elements 20, 30, 40. In one embodiment, shown in FIG. 4, the closed carriage plane lies along the central axis 90.

Folding the legs against the carriage 15 converts the system 10 into a compact arrangement for storing or transporting the entire system 10. Like the folding of the body 50 illustrated in FIG. 3, the folding of the legs and stabilizer 20, 30, 40 may be accomplished manually or by an automatic method, such as using motors controlled by an onboard computer.

Referring briefly to FIG. 1, the first leg 20 and the lateral stabilizer 30, together with the adjoining console 80, all lie within or near the closed carriage plane. In this aspect, those elements already lying in or near the closed carriage plane do not require a hinged or pivotable connection with respect to the carriage 15. When folded, the other elements of the carriage 15 will also lie within the closed carriage plane, as shown in FIG. 4.

In one aspect of the present invention, the system 10 is dimensioned to be easily transported by a typical person. The human body and its extremities have a limited range of motion and postures that are safe and comfortable when moving an object. Designing equipment with the best sizes and shapes is difficult because the dimensions of the human body vary from person to person and across populations. Anthropometric data has been collected and tabulated in percentile groups for static tasks, such as grasping a handle, and functional tasks, such as operating a screwdriver.

Functional reach data may be used to locate objects so they can be touched or grasped with minimal body movement. A standing person, for example, has a functional reach limit extending outward from the shoulder. When an object is grasped, the functional reach limit may extend from the shoulder outward for a distance equal to the total arm length minus approximately one half of the hand length. Using the range of motion of the shoulder and the distance of the functional reach limit for grasping, a three-dimensional reach envelope can be determined that approximates the space above the ground in which an object can be comfortably grasped. The effective radius of a reach envelope in any single direction may vary depending on the capacity of the shoulder and elbow and wrist, among other factors. The term reach envelope, as used herein, refers to the three-dimensional space in which an object may be comfortably grasped by a standing person.

Three or More Positions

Figure 7:
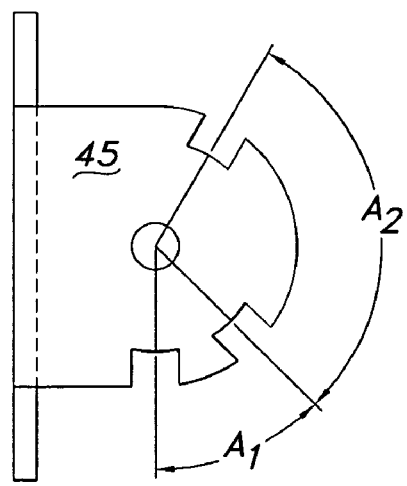
FIG. 7 is a side view of a locking pivot assembly, according to one embodiment of the present invention.

As shown in FIG. 4, the second leg 40 of the carriage 15 may be rotated into one or more positions. In one embodiment, the second leg 40 is connected to the carriage 15 by one or more locking pivot assemblies 45. The pivot assembly 45 allows the second leg 40 to be rotated and locked in three positions in this embodiment. The pivot assembly 45 may include holes or notches, as shown in FIG. 7, into which a spring-loaded pin or other locking device may be inserted. The angular relationship between the three locking positions may begin with a generally vertical position, as shown in FIG. 7. An intermediate locking position may be spaced apart from the vertical position by a first angle A1 which, in one embodiment, may be 45 degrees. The next locking position may be spaced apart from the intermediate position by a second angle A2 which, in one embodiment, may be 105 degrees. Other angular relationships may exist between multiple locking positions, depending upon the size, shape, and function of the carriage 15, the body 50, and the system 10 as a whole. In one embodiment, the locking pivot assembly 45 is fully adjustable and lockable at any angle, throughout the assembly's entire range of motion, providing an infinite number of possible locking angles for the second leg 40. An assembly similar to the locking pivot assembly 45 may be provided for the first leg 20 or the lateral stabilizer 30.

The carriage 15 may include a means for locking any one or more of the legs 20, 40, and lateral stabilizer 30 in a certain position. The locking pivot assembly 45 used to secure the second leg 40 in a desired position is one example of a means for locking, although the term includes a variety of other means for locking a generally elongate member at a particular angle with respect to a pivot point. The means for locking may include a spring-biased mechanical pin to be moved manually, a motorized drive exerting a constant force on an element in a particular position, or any of a variety of methods and techniques for stabilizing an element. The particular technique used for locking the legs 20, 40 or stabilizer 30 may also be used to unlock those elements when desired. Accordingly, the term "means for locking" also includes a means for unlocking.

In one aspect of the invention, the locking pivot assembly 45 of the present invention allows the carriage 15 to be quickly folded or unfolded, using no tools. In a related aspect, the various elements of the carriage 15 are positioned such that the carriage 15 remains generally balanced during folding and unfolding. More specifically, with the body 50 collapsed against the carriage 15, as shown in FIG. 4, rotation of the second leg 40 may be easily accomplished because the system 10 is generally well balanced and compact with respect to the axis 90.

The locking pivot assembly 45 is configured, in one embodiment, to allow the second leg 40 to be rotated in order to move the carriage 15 into three basic positions: a station-keeping position, an extended position, and a collapsed position. In one aspect of the present invention, the system 10 may be transported readily, and in a stable and balanced state, with the carriage 15 in any of the various positions. Transport may be facilitated by disengaging the drive assemblies, if any, or otherwise allowing free movement of the contact elements 29, 39, 49. The three positions of the second leg 40 in one embodiment are shown in FIG. 4.

The Open or Station-Keeping Position

The station-keeping position shown in FIG. 2 is also referred to herein as one of the possible open positions formed by the carriage 15. The second leg 40 may be rotated about the pivot assembly 45 to a station-keeping position, in which the second contact element 49 rests on the ground, spaced apart from the other contact elements 29, 39. In conjunction with the first leg 20 and the lateral stabilizer 30, the second leg 40 in the station-keeping position provides balanced and stable support for the body 50 and the entire system 10.

In an alternative embodiment, shown in FIG. 12, the carriage 15 is shown in an upright open position, in which the second contact element 49 does not rest on the ground. The lateral stabilizer 30 maintains balance for the system 10 with a single pair of contact elements 29 engaging the ground. The second leg 40 may be stored, in effect, in the vertical position shown in FIG. 12.

In another embodiment, shown in FIG. 11, the carriage 15 may also stand in an upright open position (not shown) without resting on the second contact element 49. In this aspect, the size of the ground contact elements 29, 39 may act as a lateral stabilizer 30 and help maintain balance for the system 10.

FIG. 12 further depicts a second open position for the carriage 15, in which the second leg 40 may be partially opened to an intermediate angle, as shown, with the second contact element 49 resting on the ground, and used as an alternative means of stabilizing the system 10 in a somewhat-reclined open position. In use, the system 10 may be programmed or otherwise configured to fully operate in this position. In this aspect, the system 10 of the present invention may operate in multiple postures, each of which can be described as an open position. It will be appreciated, by referring to FIG. 12 as well as FIG. 4, that the second leg 40 in the open position is generally not substantially parallel to the axis 90 of the carriage 15. The non-parallel orientation of the legs 20, 40 and stabilizer 30 is one of the characteristic features of the plurality of open positions.

In use, the second contact element 49 may work together with the lateral stabilizer 30 to maintain balance for the system 10 shown in FIG. 12. Also, in the open position shown, the second leg 40 may be used as a sort of kickstand for temporary storing the system 10 in a reclined position. The storage option provided by this open position may be used to relieve the lateral stabilizer 30 from the constant task of maintaining balance at times when the system 10 may be operating in a resting mode. In this aspect, the kickstand function provided by the second leg 40 saves energy and may act as a backup balancer in case the lateral stabilizer 30 fails for any reason. In such an event, the system 10 may include a servomotor configured to automatically extend the second leg 40 and recline the system 10 toward the rear. Alternatively, the system 10 may include a spring-mounted second leg 40 biased toward the partially-extended kickstand position with an automatic release, in conjunction with an overall weight distribution that uses the force of gravity to urge the system 10 to recline toward the rear and rest on the kickstand.

A characteristic of the open or station-keeping position is that the carriage 15 and system 10 is substantially balanced with respect to the horizontal plane. The concept of an object being substantially balanced includes both static and dynamic conditions. In other words, in the open position, the system 10 is statically balanced (meaning the system 10 will not fall or tilt with respect to a horizontal plane) and dynamically balanced (meaning the system 10 will not fall or tilt with respect to a horizontal plane, even when the carriage 15 and/or the body 50 is in motion with respect to one another or with respect to the ground).

In the open position, the motorized drive assemblies, if any, may engage one or more of the ground contact elements and thereby move the system 10 in a desired direction. For a system 10 like the one depicted in FIG. 1 having three ground contact elements 29, 39, 49, motion of the system 10 may be accomplished by powering any one, any two, or all three contact elements 29, 39, 49. The open position generally describes the configuration of the system 10 when in use.

The Closed, Extended Position

Two closed positions are shown in FIG. 4: (1) an extended position, in which the second leg 40 is rotated in a generally upward direction; and, (2) a collapsed position, in which the second leg 40 is rotated in a generally downward direction. It will be appreciated, by referring to FIG. 4, that the second leg 40 is substantially parallel to the axis 90 in both of the closed positions shown. The substantially-parallel orientation of the legs 20, 40 and stabilizer 30, along with the axis 90, is one characteristic feature of the plurality of closed positions.

Figure 5:
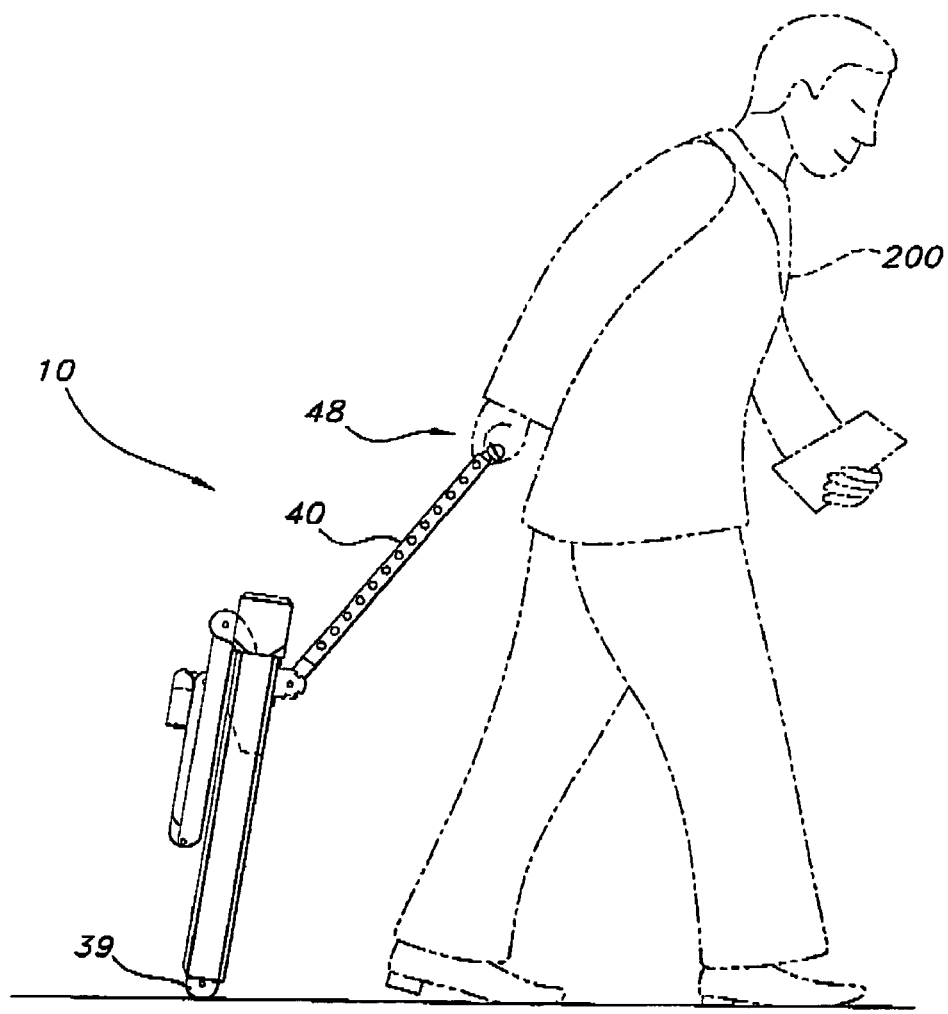
FIG. 5 is a side view of a system in a closed, extended position being transported by a person, according to one embodiment of the present invention.

FIG. 5 is a side view of the second leg 40 in its extended position, according to one embodiment of the present invention. The extended position shown in FIG. 5 is also referred to herein as one of the possible closed positions formed by the carriage 15. In the extended position, the second leg 40 extends upward and may be grasped by a user 200 who may pull the entire system 10 as the front and/or lateral contact elements 29, 39 roll or otherwise travel along the ground. Transport in this manner may be facilitated by disengaging the drive assemblies, if any, or otherwise allowing free movement of one or more of the contact elements 29, 39 that are still in contact with the ground.

In an alternative embodiment, shown in FIG. 12, the second leg 40 is shown in several closed positions, including the upright or extended position, in which the second leg 40 may be grasped by a user 200.

The second leg 40 may include a handle or pull 48 (shown in FIGS. 4 and 5) positioned near the second contact element 49, for example, in order to facilitate the user's grasp on the system 10 while pulling. For systems of different sizes, the pull 48 may be located at a different location suitable for grasping by a particular user. In one embodiment, the location of the pull 48 is adjustable.

With the system 10 in this extended position, the second leg 40 in this embodiment lies nearly parallel to the axis 90 and along the same closed carriage plane as the other legs of the carriage 15. Also, with the body 50 fully collapsed, as shown in FIG. 4, the segments of the system 10 generally lie along or near the same plane. This arrangement provides a compact and balanced system 10 for easy rolling, as one might roll a handtruck or a dolly. Additionally, this arrangement gives the system 10 a relatively slim profile.

In the closed position with one of the legs 20, 40 or the stabilizer 30 in an extended position, the motorized drive assemblies, if any, are typically disengaged from the ground contact elements 29, 39, 49 by the system 10 to allow the elements still in contact with the ground to roll freely. For example, in a system 10 like the one shown in FIG. 5, the carriage 15 may include a means for disengaging any type of drive assembly from the ground contact elements 29, 39 so the system 10 may roll freely, making transport easier for the user 200 and preventing damage or unnecessary loading of the drive assemblies. The carriage 15 may include a means for disengaging a drive assembly from a ground contact element, such as providing an automatic power disconnect to the particular drive, or providing a system of gears including a spring-biased drive gear configured to un-mesh from its mating gear upon receipt of a signal, or any other of a variety of techniques that accomplish the goal of freeing the ground contact element from any mechanical or other load. The particular technique used for disengaging the drive assembly may also be used to re-engage the drive assembly when desired. Accordingly, the term "means for disengaging" also includes a means for engaging.

The Closed, Collapsed Position

Figure 6:
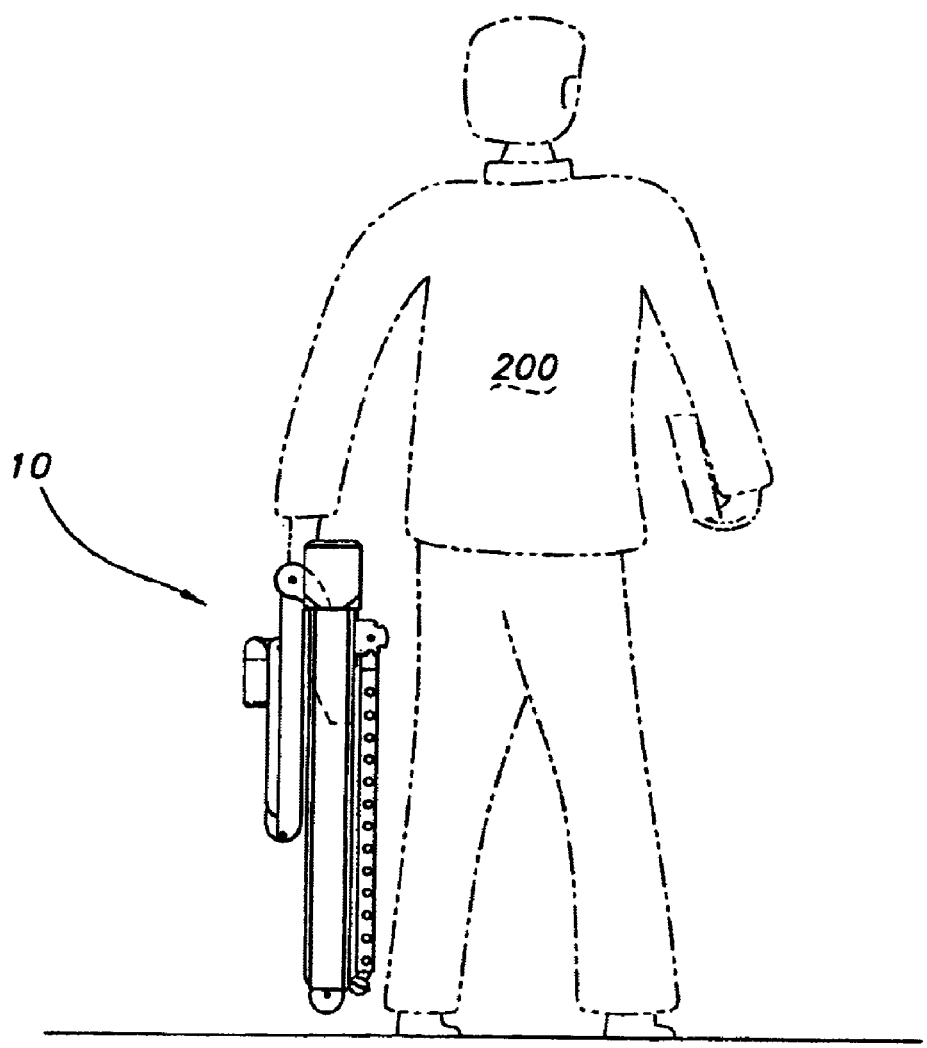
FIG. 6 is a side view of a system in a closed, collapsed position being transported by a person, according to one embodiment of the present invention.

FIG. 4 is a side view of the second leg 40 in its collapsed position, according to one embodiment of the present invention. The collapsed position shown in FIG. 4 is also referred to herein as one of the possible closed positions formed by the carriage 15. Also shown are the other positions of second leg 40. In FIG. 6, the system 10 is shown in its collapsed position, being carried by a user 200 who holds the system 10 generally perpendicular to the ground, like a suitcase. The slim profile of the system 10 in its collapsed position makes carrying easier for several reasons. The slim profile allows the user 200 to carry the system 10 closer to the body than would be possible with a wider, bulkier apparatus, causing less strain on the body. Also, the location of the segments of the system 10 along or near the same general plane concentrates the weight more centrally, reducing the amount of torque or twisting exerted by the system 10 on user's body during carrying.

In an alternative embodiment, shown in FIG. 12, the second leg 40 is shown in several closed positions, including a collapsed position in which the second leg 40 is substantially vertical.

In one embodiment, the carriage 15 may include a handle 16 positioned for easy grasping by the user 200 and located such that the system 10 when carried will not drag the ground. One position for the handle 16 is shown in FIG. 9, which corresponds to the grasping location shown in FIG. 6. More than one handle 16 may be provided at different locations in order to accommodate different carrying postures and users 200 of different sizes and strengths. In another aspect, one or more handles 16 may be provided which serve multiple purposes, from carrying the system 10 to maneuvering the system 10 during setup or use. In one embodiment, the location of the handle 16 is adjustable.

In the closed position with one of the legs 20, 40 or the stabilizer 30 in a collapsed position, the motorized drive assemblies, if any, may or may not be disengaged from the ground contact elements 29, 39, 49 by the system 10. When the system 10 is being carried, as shown in FIG. 6, the ground contact elements 29, 39, 49 are typically not touching the ground. It will be appreciated that the system 10 is being carried at a height sufficiently above the ground to avoid dragging the system 10 or otherwise striking the ground. The clearance between the ground and the lowermost edge of the system 10 is referred to herein as the lift distance. A lift distance of six inches, for example, would place the handle 16 within six inches of a person's reach envelope. When lifted by the handle 16, the system 10 could be lifted to a height approximately six inches above the ground. In designing the system 10, the lift distance may be dimensioned to provide a system 10 that is as large lengthwise as practical without making it impossible for a person 200 to carry the system 10 easily above the ground. It will be appreciated by those skilled in the art that the lift distance may also depend upon the known reach envelope for a typical user 200 as well as the weight and overall width of the system 10.

Storage in confined areas is also provided by the folding carriage 15 of the present invention, making the system 10 well suited for transport carriers who may offer limited storage space. In another aspect of the present invention, the system 10 may be stored with the carriage 15 in any of the various open or closed positions. With the second leg 40 in the open or station-keeping position, storage of the system 10 in a free-standing posture is permitted. With the second leg 40 in the closed position (either extended or collapsed), storage is also permitted by leaning the system 10 against a wall or other structure. In one embodiment, the system 10 is balanced in either of the closed positions and, thus, may be stored in a free-standing posture without leaning against or otherwise receiving support from another structure.

The described embodiments of the invention are intended to be merely exemplary. Numerous variations and modifications will be apparent to those skilled in the art. All such variations and modifications are intended to fall within the scope of the present invention as defined in the appended claims.

What is claimed is:

1. A robotic apparatus capable of moving over a surface, comprising:
   a trunk comprising one or more segments pivotably connected;
   at least one first leg having a first proximal end adjacent to and supporting said trunk and an opposing first distal end, said at least one first leg comprising a first contact element connected to said first distal end by a first mounting assembly;
   at least one second leg having a second proximal end adjacent to and supporting said trunk and an opposite second distal end, said at least one second leg comprising a second contact element connected to said second distal end by a second mounting assembly;
   at least one lateral stabilizer having a fixed end and an opposing free end, said at least one lateral stabilizer comprising a lateral contact element connected to said free end by a lateral mounting assembly;
   at least one motorized assembly connected to drive one of said contact elements of a member selected from the group consisting of said at least one first leg, said at least one second leg, and said at least one lateral stabilizer; and
   means for disengaging said at least one motorized assembly such that said one of said contact elements moves freely,
   wherein said legs and said stabilizer are foldable with respect to said trunk from at least one open position in which said robotic apparatus is substantially balanced with respect to said surface, to at least one closed position in which said legs and said stabilizer are substantially parallel to one another and define a closed carriage plane,
   wherein one of said at least one closed positions is further characterized by a portion of said member being positioned within a reach envelope of a person, said reach envelope approximating a space above said surface in which an object may be grasped, and
   wherein said portion within said reach envelope comprises a pull for grasping by said person.

2. A robotic apparatus capable of moving over a surface, comprising:
   a trunk comprising one or more segments pivotably connected;
   at least one first leg having a first proximal end adjacent to and supporting said trunk and an opposing first distal end, said at least one first leg comprising a first contact element connected to said first distal end by a first mounting assembly;
   at least one second leg having a second proximal end adjacent to and supporting said trunk and an opposing second distal end, said at least one second leg comprising a second contact element connected to said second distal end by a second mounting assembly;
   at least one lateral stabilizer baring a fixed end and an opposing free end, said at least one lateral stabilizer comprising a lateral contact element connected to said free end by a lateral mounting assembly;
   at least one motorized assembly connected to drive one of said contact elements of a member selected from the group consisting of said at least one first leg, said at least one second leg, and said at least one lateral stabilizer; and
   means for disengaging said at least one motorized assembly such that said one of said contact elements moves freely, wherein said legs and said stabilizer are foldable with respect to said trunk from at least one open position in which said robotic apparatus is substantially balanced with respect to said surface, to at least one closed position in which said legs and said stabilizer are substantially parallel to one another and define a closed carriage plane; and
   a handle located within a lift distance from a reach envelope of a person when said system is in one of said at least one closed positions, said reach envelope approximating a space above said surface in which an object may be grasped, said lift distance being less than a radius of said reach envelope.

3. A robotic apparatus capable of moving over a surface, comprising:
   a trunk comprising one or more segments pivotably connected;
   at least one first leg having a first proximal end adjacent to and supporting said trunk and an opposing first distal end, said at least one first leg comprising a first contact element connected to said first distal end by a first mounting assembly;
   at least one second leg having a second proximal end adjacent to and supporting said trunk and opposing second distal end, said at least one second leg comprising a second contact element connected to said second distal end by a second mounting assembly;
   at least one lateral stabilizer having a fixed end and an opposing free end, said at least one lateral stabilizer comprising a lateral contact element connected to said free end by a lateral mounting assembly;
   at least one motorized assembly connected to drive one of said contact elements of a member selected from the group consisting of said at least one first leg, said at least one second leg, and said at least one lateral stabilizer; and
   means for disengaging said at least one motorized assembly such that said one of said contact elements moves freely,
   wherein said legs and said stabilizer are foldable with respect to said trunk from at least one open position in which said robotic apparatus is substantially balanced with respect to said surface, to at least one closed position in which said legs and said stabilizer are substantially parallel to one another and define a closed carriage plane,
   wherein one of said at least one closed positions is further characterized by said free end of said lateral stabilizer being positioned within a reach envelope of a person, said reach envelope approximating a space above said surface in which an object may be grasped, and wherein one of said at least one closed positions is further characterized by a pull connected to said lateral stabilizer and located within said reach envelope.

4. A mobile robotic apparatus, comprising:

a trunk;

a contact element supporting said trunk and powered by a drive assembly for transporting said apparatus over a surface;

means for disengaging said drive assembly such that said contact element moves freely; and a lateral stabilizer configured to balance said apparatus with respect to said surface, wherein said contact element is foldable with respect to said trunk, from a plurality of open positions in which said apparatus is substantially balanced, to a plurality of closed positions in which said trunk and said element are substantially parallel, and wherein said contact clement comprises:

a lower element having a joint end and an opposing distal end; and an upper element connected to said lower element at a joint, said upper element having a joint end and an opposing graspable end, wherein said upper element is foldable with respect to said lower element to form a first closed position of said plurality of first closed positions, said plurality of first closed positions characterized in that:

said distal end of said lower element is in contact with said surface;

said upper element is substantially parallel to said lower element; and said graspable end lies with a reach envelope of a person, said reach envelope approximating a space above said surface in which an object may be grasped.

5. A mobile robotic apparatus, comprising:

a trunk;

a contact element supporting said trunk and powered by a drive assembly for transporting said apparatus over a surface;

means for disengaging said drive assembly such that said contact element moves freely; and a lateral stabilizer configured to balance said apparatus with respect to said surface, wherein said contact element is foldable with respect to said trunk, from a plurality of open positions in which said apparatus is substantially balanced, to a plurality of closed positions in which said trunk and said element are substantially parallel, and wherein said contact element comprises:

a lower element having a joint end and an opposing distal end; and an upper element connected to said lower element at a joint, said upper element having a joint end and an opposing graspable end, wherein said upper element is foldable with respect to said lower element to form a first closed position of said plurality of first closed positions, said plurality of first closed positions characterized in that:

said distal end of said lower element is in contact with said surface;

said upper element is substantially parallel to said lower element; and said graspable end lies with a reach envelope of a person, said reach envelope approximating a space above said surface in which an object may be grasped, and wherein said joint further comprises a handle and wherein said upper element is foldable with respect to said lower element to form a second closed position of said plurality of first closed positions, said second closed position characterized in that:

said distal end of said lower element is in contact with said surface;

said upper element is substantially parallel to said lower element;

said graspable end lies near said distal end; and said handle lies within a lift distance from a reach envelope of a person, said reach envelope approximating a space above said surface in which an object may be gasped, and said lift distance being less than a radius of said reach envelope.

6. A mobile robotic apparatus, comprising:

a trunk;

a contact element supporting said trunk and powered by a drive assembly for transporting said apparatus over a surface;

means for disengaging said drive assembly such that said contact element moves freely; and a lateral stabilizer configured to balance said apparatus with respect to said surface, wherein said contact element is foldable with respect to said trunk, from a plurality of open positions in which said apparatus is substantially balanced, to a plurality of closed positions in which said trunk and said element are substantially parallel, and wherein said contact element comprises:

a lower element having a joint end and an opposing distal end; and an upper element connected to said lower element at a joint, said upper element having a joint end and an opposing graspable end, wherein said upper element is foldable with respect to said lower element to form a first closed position of said plurality of first closed position of said plurality of first closed positions characterized by:

said distal end of said lower element is in contact with said surface;

said under element is substantially parallel to said lower element; and said graspable end lies with a reach envelope of a person, said reach envelope approximating a space above said surface in which an object may be grasped, and wherein said joint further comprises a handle and wherein said upper element is foldable with respect to said lower element to form a second closed position of said plurality of first closed positions, said second closed position characterized in that:

said distal end of said lower element is in contact with said surface;

said upper element is substantially parallel to said lower element;

said graspable end lies near said distal end; and said handle lies within a lift distance from a reach envelope of a person, said reach envelope approxi mating a space above said surface in which an object may be grasped, and said lift distance being less than a radius of said reach envelope;

wherein said contact element further comprises an auxiliary element connected to said joint and having a joint end and an opposing handle end, wherein said auxiliary element is foldable with respect to said upper element and with respect to said lower element, to form a third closed position of said plurality of first closed positions, said third closed position characterized in that:

said auxiliary element is substantially parallel to said upper element and to said lower element;

said handle end lies with said reach envelope of a person.

* * * * *

UNITED STATES PATENT AND TRADEMARK OFFICE
CERTIFICATE OF CORRECTION

PATENT NO. : 6,999,849 B2
APPLICATION NO. : 10/351451
DATED : February 14, 2006
INVENTOR(S) : Bridges It is certified that error appears in the above-identified patent and that said Letters Patent is hereby corrected as shown below:

<u>Column 17,</u>
Line 32, "opposite" should read -- opposing --.

<u>Column 18,</u>
Line 9, "baring" should read -- having --;
Line 17, delete "and";
Line 43, after "trunk and" insert -- an --.

Signed and Sealed this

Twentieth Day of June, 2006

JON W. DUDAS
*Director of the United States Patent and Trademark Office*